March 10, 1970 TAKASHI SUGIYAMA ETAL 3,500,109

INTEGRATING ANALOG-TO-DIGITAL CONVERTER USABLE IN DIGITAL VOLTMETERS

Filed Sept. 7, 1967 6 Sheets-Sheet 1

March 10, 1970 TAKASHI SUGIYAMA ETAL 3,500,109

INTEGRATING ANALOG-TO-DIGITAL CONVERTER USABLE IN DIGITAL VOLTMETERS

Filed Sept. 7, 1967 6 Sheets-Sheet 3

United States Patent Office 3,500,109
Patented Mar. 10, 1970

3,500,109

INTEGRATING ANALOG-TO-DIGITAL CONVERTER USABLE IN DIGITAL VOLTMETERS

Takashi Sugiyama, Tomoyuki Tanabe, Hisao Nakane, and Yoshio Oguma, Tokyo, Japan, assignors to Yokogawa Electric Works Ltd.

Filed Sept. 7, 1967, Ser. No. 666,099
Claims priority, application Japan, Sept. 12, 1966, 41/60,255
Int. Cl. G01r *17/06*
U.S. Cl. 324—99 6 Claims

ABSTRACT OF THE DISCLOSURE

A digital voltmeter is provided with a pulse width modulator including an addition integrator adapted to add a pair of positive and negative reference voltages which are alternately supplied and an input voltage and to integrate the sum of the voltages, a reference signal oscillator to generate a signal of a constant recurring frequency, and a voltage comparator adapted to compare the output from said integrator with the output from said reference signal oscillator to generate an output which operate to switch said pair of reference voltages so that the mean value of the sum of the voltages impressed upon the input terminal of the integrator becomes zero whereby the pulse width modulator generates a pulse width modulated signal proportional to the value of the input signal. The digital voltmeter is also provided with a digital measuring circuit for the pulse width which repeatedly and digitally measures the pulse width of the output pulse from the pulse width modulator.

This invention relates to an analogue to digital converter of the pulse width modulation type, for use in digital voltmeters and the like, wherein pulse signals of a constant frequency are subjected to pulse width modulation effected by input analogue signals and the pulse width of the modulated signals is digitally counted whereby to obtain digital outputs corresponding to the analogue signals.

An object of this invention is to provide a digital voltmeter capable of accurately measuring only the DC component of the input without being influenced by the AC component superposed upon the input signal.

Another object of this invention is to provide a digital voltmeter which can measure stably and accurately even very small voltages of the input signals near zero volt.

A further object of this invention is to provide a novel digital voltmeter having such circuit construction that the pulse width modulated signals corresponding to positive or negative input analogue signals are counted by means of a pulse counter which performs counting operation in only one direction, thus enabling to count and indicate input voltages of two polarities.

While the specification concludes with claims particularly pointing out and distinctly claiming the subject matter which is regarded as the invention, it is believed that the invention will be better understood from the following description taken in connection with the accompanying drawings in which:

Figure 1:
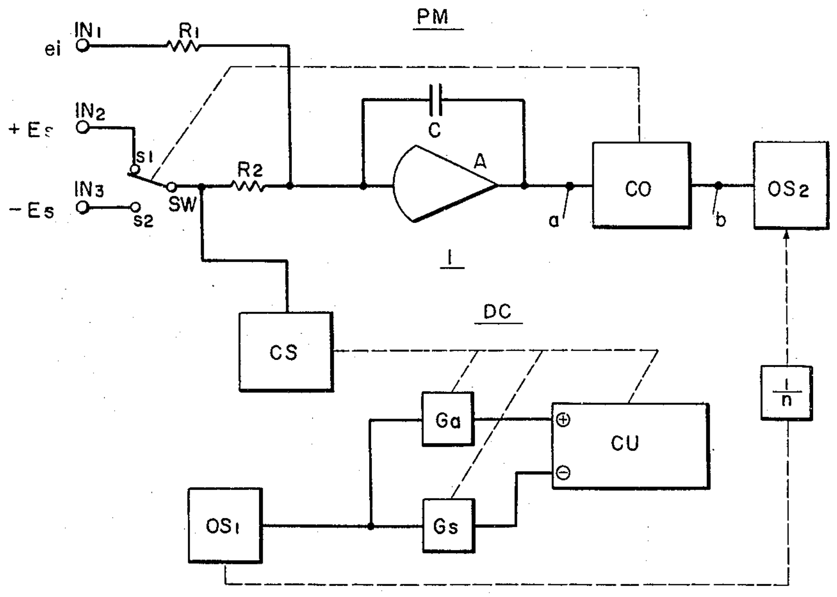
FIG. 1 is a block diagram showing the construction of an analogue digital converter of the pulse width modulation type employed in the digital voltmeter embodying this invention.

Referring now to FIG. 1 the analogue digital converter of the pulse width modulation type shown therein comprises a pulse width modulator PM and a pulse width indicating means DC. The pulse width modulator PM includes an input terminal $IN_2$ for analogue voltages to be converted, input terminals $IN_2$ and $IN_3$ for reference voltages, a transfer switch SW and resistance elements $R_1$ and $R_2$. These resistance elements are connected to the input of an amplifier A which is shunted by a capacitor C, said amplifier A and capacitor constituting an integrator I. The output from the integrator I is supplied to a voltage comparator which functions to compare the magnitudes of the voltages impressed upon input terminals *a* and *b* to produce a signal to actuate the transfer switch SW. $OS_2$ designates an oscillator for determining the pulse frequency.

As shown in FIG. 1 the signal input terminal $IN_1$ is connected to the input terminal of the integrator I through the resistor $R_1$ and reference voltage input terminals $IN_2$ and $IN_3$ are connected to contacts $s_1$ and $s_2$, respectively, of the transfer switch SW, the movable contact thereof being connected to the input terminal of the integrator I via a resistor $R_2$. The output terminal of the integrator I is connected to the input terminal *a* of the voltage comparator CO while the other input terminal *b* thereof is connected to the output terminal of the oscillator $OS_2$. Reference voltage input terminals $IN_2$ and $IN_3$ respectively receive a pair of reference voltages of opposite polarities $+E_s$ and $-E_s$.

The pulse width measuring device DC includes a counting controller CS, a clock pulse oscillator $OS_1$, gate circuits $G_a$ and $G_s$ and a reversible counter CU. The output terminal of the clock pulse oscillator $OS_1$ is connected to a positive input terminal for addition signals of the reversible counter CU and to a negative input terminal for subtraction signals of the reversible counter. Enabling and disenabling of the gate circuits $G_a$ and $G_s$, stopping of the counting operation as well as resetting of counted values of the reversible counter CU are controlled by the counting controller CS.

Figure 2:
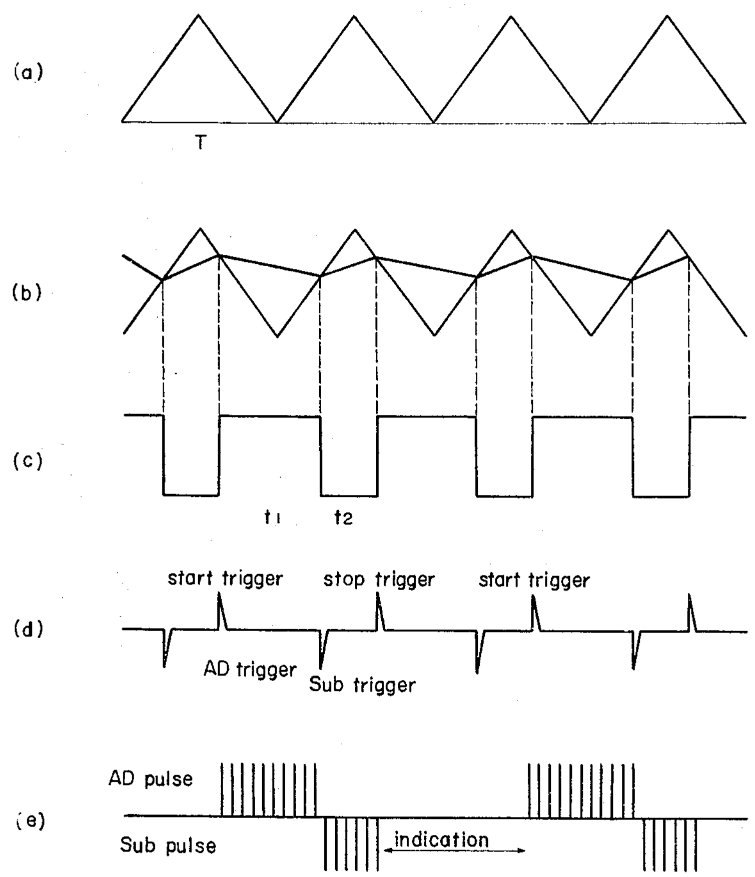
FIG. 2 shows wave shapes helpful to explain the operation of the analogue digital converter shown in FIG. 1.

The operation of the device constructed as above described is as follows. Thus, the integrator I operates as an addition integrator to integrate the sum of the input voltage *ei* and either the positive reference voltage $+E_s$ or the negative reference voltage $-E_s$ which are selectively supplied through the transfer switch SW. The output voltage of the integrator I decreases during the period wherein the movable contact of the transfer switch SW is thrown to the upper contact $s_1$ to integrate the sum of the positive reference voltage $+E_s$ and the input voltage $e_i$ whereas increases during the period wherein the movable contact is thrown to the lower contact $s_2$ to integrate the sum of the negative reference voltage $-E_s$ and the input voltage $e_i$ and these output voltages are impressed upon the input terminal *a* of the voltage comparator CO. On the other hand the other input terminal *b* of the voltage comparator CO receives a triangular voltage of a constant recurring frequency, as shown in FIG. 2*a*, of the output from the frequency determining oscillator $OS_2$ which is synchronized to $1/n$ of the frequency of the clock pulse oscillator $CS_1$. For this reason, as shown in FIGS. 2*b* and 2*c*, the voltage comparator CO operates such that, during the period $t_1$ in which the output voltage supplied to its input terminal *a* from the integrator I is larger than the output voltage supplied to its terminal *b* from the oscillator $OS_2$, the movable contact of the transfer switch SW is thrown to the contact $s_1$ thus applying the positive reference voltage $+E_s$, whereas during the period $t_2$ wherein the output voltage from the integrator I is smaller than the output from the oscillator $OS_2$, the movable contact of the transfer switch SW is thrown to the lower contact $s_2$ thus applying the negative reference voltage $-E_s$ to the integrator I. In this manner, the voltage comparator CO drives the movable contact of the transfer switch SW so that the mean value of the sum of the input voltages to the integrator I becomes zero.

As a result $$\frac{e_i}{R_1}+\frac{E_s}{R_2}\cdot\frac{t_1}{T}-\frac{E_s}{R_2}\cdot\frac{t_s}{T}=0$$

$$\frac{t_1-t_2}{T}=-\frac{R_2}{R_1}\cdot\frac{e_i}{E_s}=K_{ei}$$

where $T=t_1+t_2$

It will thus be seen that the pulse width of the output pulses varies in proportion to the input signal $e_i$. Since the magnitude of the output signal from the oscillator $OS_2$ is selected to be sufficiently larger than that of the output signal from the integrator I the output from the integrator I always crosses twice times during each one cycle of the output signal from the oscillator $OS_2$ as shown in FIG. 2*b* to cause the frequency of the time division signal which is the output from the comparator CO to coincide with the frequency of the output signal from the oscillator $OS_2$.

The count controller CS of the pulse width measuring device DC operates to differentiate the output signal from said pulse width modulator to provide a differentiated signal as shown in FIG. 2*d* whereby to control the operation of the gates $G_a$ and $G_s$ and the reversible counter CU. Thus during the period $t_1$ during which the movable contact of the transfer switch SW is thrown to the contact $s_1$ to provide positive pulse output signal, the gate $G_a$ is enabled to apply the output from the clock pulse oscillator $OS_1$ to the positive input terminal for the addition signal of the reversible counter CU. During the period $t_2$ wherein the movable contact of the transfer switch SW is thrown to the contact $s_2$ to provide the negative pulse output signal, the gate $G_a$ will be enabled while the gate $G_s$ is disenabled to apply the output from the clock pulse oscillator $OS_1$ to the negative terminal for the subtraction signal of the reversible counter CU. As a consequence, as shown in FIG. 2*e*, the reversible counter CU will add the output pulse from the clock pulse oscillator during the period $t_1$ in which the positive output pulse is provided during the first cycle of the output signal from the pulse width modulator DC, whereas subtract the output pulse of said clock pulse oscillator $OS_1$ from said sum during the period $t_2$ in which the negative output pulse is provided. When said addition and subtraction operations are finished in the first cycle, the gates $G_a$ and $G_s$ would be disenabled or closed to indicate said counted value during the second cycle. As described hereinabove since the reversible counter operates to count the number of clock pulses during the period $t_1$ in which the positive pulse signal is sent out during one cycle of the output pulse of the pulse width modulator and to subtract the output of the clock pulse oscillator from said counted value during the interval in which the negative pulse signal is sent out, the counted value of the reversible counter would be represented by $K(t_1-t_2)$, thus providing a digital value proportional to the pulse width of the output pulse from the pulse modulator in this cycle or the value of the input signal.

Upon termination of the indicating period of said second cycle the counted value of the reversible counter will be reset and during the subsequent third cycle, the pulse width of the output signal from the pulse width modulator will be measured in the same manner as in the first cycle. In this manner, the analogue-digital converter shown in FIG. 1 effects alternately the addition and subtraction operations of said pulse width measurement and the indication or display operation of the result of counting in each cycle to indicate the digital value of the input signal. Since it is possible to make considerably high the frequency of the output pulse of the pulse width modulator by repeating said measurement and indicating operations at a high speed, for example at a period of about 10 ms., it would become possible to display the counted value of the reversible counter by stationary digits.

While in FIG. 1, an example was illustrated wherein a triangular voltage of a constant recurring frequency comprised by the output from the oscillator $OS_2$ is applied to the terminal *b* of the voltage comparator CO in order to determine the frequency of the pulse width signal, the same result could be obtained by applying to the input side of the integrator a rectangular wave voltage having the same frequency as the triangular voltage instead of the triangular voltage, then integrating the rectangular voltage by means of the integrator I to obtain a triangular voltage on its output side, which is utilized for frequency determination.

As described hereinabove, since in the analogue-digital convertor shown in FIG. 1 a circuit for obtaining a pulse width modulation signal having a pulse width corresponding to the input analogue signal is arranged in parallel with a circuit which digitally measure the pulse width of the pulse width modulated signal and since no digital circuit is included in the measuring loop for the input signal as in the conventional analogue-digital converters it is necessary to use a local decoder to convert digital signals into analogue signals and the like device thus providing excellent analogue-digital converters of good response characteristics and of simple circuit construction.

Figure 3:
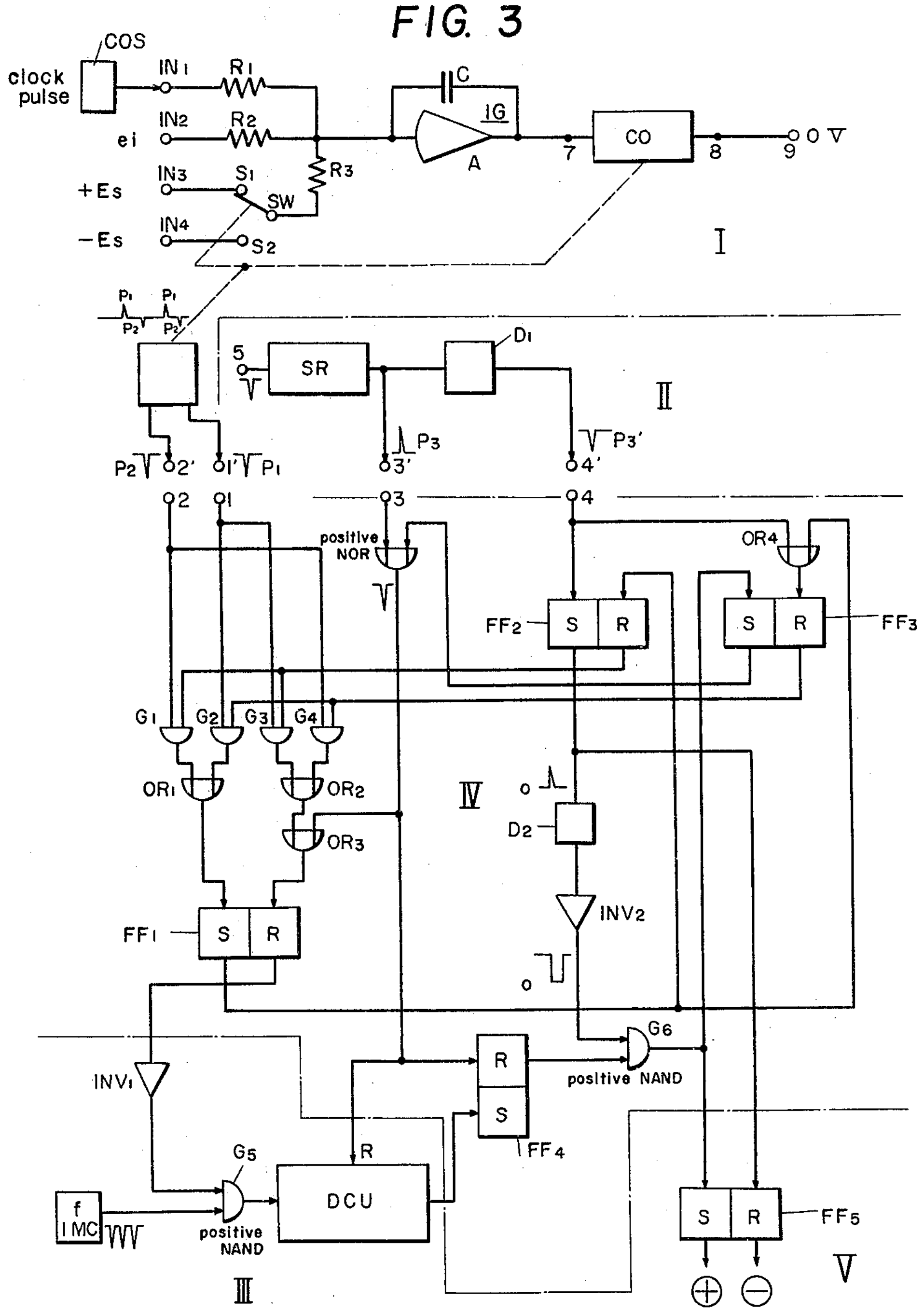
FIG. 3 is a block diagram illustrating one example of the digital voltmeter of this invention, and FIGS. 4, 5 and 6 respectively show wave forms helpful to explain the operation of the digital voltmeter of this invention.

FIG. 3 is a block diagram illustrating one embodiment of the digital voltmeter according to this invention. The digital voltmeter shown in FIG. 3 comprises a pulse width modulator circuit I, a sample rate circuit II, a unidirectional digital counter circuit III, a unidirectional count control circuit IV, and a positive-negative indicating circut V. The pulse width modulator circuit I includes an input terminal $IN_1$ for the rectangular wave clock pulse signal, an input terminal $IN_2$ for the analogue voltage to be measured and input terminals $IN_3$ and $IN_4$ for respective reference voltages. The pulse width modulator circuit further includes a transfer switch SW, three resistance elements $R_1$, $R_2$ and $R_3$, and an integrator IG comprised of an amplifier A and a capacitor C in parallel therewith. As in FIG. 1 a voltage comparator CO operates to compare the magnitude of the voltages impressed upon input terminals 7 and 8 thereof to generate a signal for driving the transfer switch SW. Thus driving pulse is applied as a negative pulse to the input terminals 1 and 2 of a pulse width measuring device to be described later.

Also an oscillator for generating a rectangular wave clock pulse signal having the same frequency as the rectangular wave generated by said transfer switch SW and a width which is set to be sufficiently larger than that of said reference singal. The input terminal $IN_1$ for the clock pulse signal is connected to the input terminal of the integrator through resistor $R_1$. The signal input terminal $IN_2$ to the integrator IG through the resistor $R_2$ whereas reference signal input terminals $IN_3$ and $IN_4$ respectively to the contacts $S_1$ and $S_2$ of the transfer switch SW. The movable contact of the transfer switch is connected to the integrator IG through the resistor $R_3$. The output terminal of the integrator IG is connected to the input terminal 7 of the voltage comparator CD while a zero voltage is impressed upon the input terminal 8 thereof. A pair of reference voltages $+E_s$ and $-E_s$ of opposite polarities are supplied to the reference voltage input terminals $IN_3$ and $IN_4$, respectively.

The sample rate circuit II includes a delay circuit SR comprised by a multivibrator and the like which operates to delay the negative pulse supplied to its input terminal 5 by a predetermined time interval, for example 0.5 to 2.0 sec. and to supply the delayed drive pulse $P_3$ to the output terminal 3. Another delay circuit $D_1$ further delays the positive drive pulse, thus supplying a negative drive pulse $P_3$ to its output terminal 4'.

The unidirectional digital counter circuit III includes a clock pulse oscillator *f* synchronized with a frequency of *n* times larger than that of the oscillator COS in said pulse width modulator circuit. A positive NAND circuit $G_5$ is provided which is constructed to be enabled or opened only when a clock output of the oscillator *f* (for example a negative pulse of 1 mc.) is supplied to one of its input and a positive voltage is impressed to the other input by a flip-flop circuit $FF_4$ for controlling the gate to be described later. DCU represents a unidirectional counter, the maximum count time T thereof being set to the same length as the period of said pulse width modulating signal. The counter DCU operates such that the counted value is reset to zero when one half of its maximum counting time T has elapsed after initiation of the counting operation, and then commence counting starting from zero again.

The unidirectional count control circuit II includes a counter gate controlling flip-flop circuit $FF_1$, negative AND gates $C_1$ through $C_4$, negative OR gates $OR_1$ through $OR_4$, flip-flop circuits $FF_2$ and $FF_3$ for controlling said OR gates $G_1$ through $G_4$, a flip-flop circuit $FF_4$ for detecting the fact that one half of the maximum counting time has elapsed since the unidirectional digit counter has began counting operation, and a positive NAND circuit similar to said gate $G_5$. Each one terminal of gates $G_1$ and $G_4$ is connected to the input terminal 2 whereas each one terminal of the gates $G_2$ and $G_3$ to the input terminal 1. Other terminals of gates $G_1$ and $G_3$ are connected to the reset output terminal of the flip-flop $FF_2$ whereas the other terminals of gates $G_2$ and $G_4$ to the reset output terminal of the flip-flop $FF_3$. Output terminals of gates $G_1$ and $G_2$ are connected to the set input terminal of the flip-flop $FF_1$ via the OR gate $OR_1$ whereas the output terminals of gates $G_3$ and $G_4$ to the reset input terminal of the flip-flop $FF_1$ through OR gates $OR_2$ and $OR_3$. The reset output terminal of the flip-flop $FF_1$ is connected to one input terminal of the gate circuit $G_5$ of the counter DCU via the inverter DCU. A drive signal input terminal 3 which receives the drive signal $P_3$ of said sample gate circuit II is connected to one input terminal of the positive NOR gate circuit, the other input terminal of the NOR gate circuit being connected to the set output terminal of the flip-flop $FF_3$. The output terminal of this NOR gate circuit is connected to the reset terminal R of the unidirectional digit counting circuit DCU, to the reset input terminal of the flip-flop $FF_4$ and to the OR gate $OR_3$. The drive signal input terminal 4 which is connected to receive the driving pulse $P_3'$ of the sample rate circuit II is connected to the set terminal of the flip-flop $FF_2$ and to the reset input terminal of the flip-flop $FF_3$ through the OR gate $OR_4$. The set output terminal of the flip-flop $FF_1$ is connected to the reset input terminal of the flip-flop $FF_3$ through the OR gate $OR_4$ and to the reset input terminal of the flip-flop $FF_2$. Output terminal of the unidirectional digit counter is connected to the set input terminal of the flip-flop $FF_4$ while the reset output terminal thereof to one input terminal of the positive NAND gate circuit $G_6$. The set output terminal of the flip-flop $FF_2$ is connected to the other input terminal of the gate through a delay circuit $D_2$ and an inverter $INV_2$, while the output terminal of the gate $G_6$ is connected to the reset input terminal of the flip-flop $FF_3$.

The positive and negative indicating circuit V includes a flip-flop circuit $FF_5$ which indicates the fact that the counted value counted by the undirectional counter DCU is whether position or negative. The output from the gate circuit $G_6$ is connected to the set input terminal while the set output terminal of the flip-flop $FF_2$ is connected to the reset terminal of the flip-flop $FF_5$.

Figure 4:
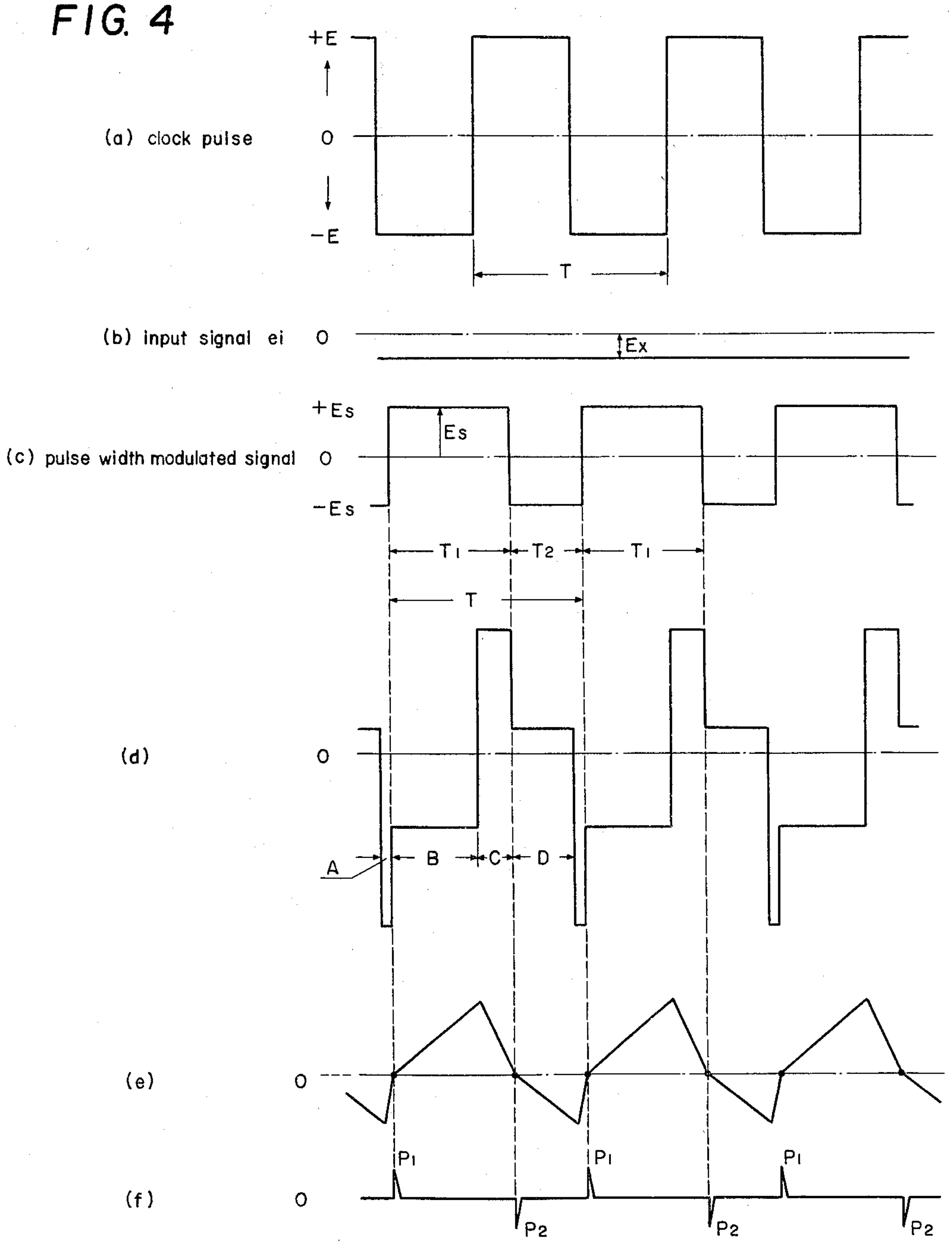

The operation of the novel digital voltmeter constructed as abovedescribed is as follows: At first the operation of the pulse width modulation circuit I will be described. The integrator IG operates as an addition integrator to integrate the sum (shown by the waveform of FIG. 4*d*) of the input signal $e_i$ of the voltage value $E_x$, shown in FIG. 4*b*, positive and negative reference voltages $+E_s$ and $-E_s$ (shown in FIG. 4*c*) which are switched by the transfer switch SW and a clock pulse voltage having a magnitude E which is larger than $E_s$ and cyclically varies between positive and negative values as shown in FIG. 4*a*. As shown by FIG. 4*e* the output of the integrator rises abruptly during a period A, increases more slowly in a period B, decreases rapidly during the next period *c* and gradually decreases during a period D. This output is applied to the input terminal 7 of the voltage comparator CO. On the other hand, a zero voltage is impressed upon the other terminal 8 of the voltage comparator. As a consequence, as shown by FIGS. 4*c* and 4*e*, the voltage comparator CO operates to throw the movable contact of the transfer switch SW to the contact $S_1$ to apply the positive reference voltage $+E_s$ to the integrator IG during the period $T_1$ wherein the output voltage of the integrator IG which is impressed upon the input terminal 7 is larger than zero voltage, whereas to throw the movable contact of the transfer switch SW to the contact $S_2$ to apply the negative reference voltage $-E_s$ to the integrator during the period $T_2$ during which the output voltage from the integrator is smaller than the zero voltage. In other words the voltage comparator CO drives the movable contact of the transfer switch SW so that the sum of the input voltages to the integrator IG would be zero. Accordingly, the pulse width of the output signal varies in proportion to the value of the input signal. More particularly, when the input signal *ei* is positive, the period $T_2$ during which $-E_s$ is impressed becomes longer than the period $T_1$ during which $+E_s$ is impressed as shown in FIG. 4*c* and the width of the period $T_2$ becomes proportional to the value $E_x$ of the input signal *ei*. On the other hand, when the input signal *ei* is negative, period $T_1$ would become longer than period $T_2$, and the width of the period $T_1$ would become proportional to the value $-E_x$ of the input signal *ei*. Further when the input signal is zero volt, then $T_1=T_2$. Accordingly, by differentiating the pulse signal shown in FIG. 4*c* to produce a pulse $P_1$ when the signal changes from $-E_s$ to $+E_s$ and a pulse $P_2$ when the signal changes from $+E_s$ to $-E_s$ it would be possible to measure the magnitude of the input signal by measuring, by means of time division scheme, the width from $P_1$ to $P_2$ and $P_2$ to $P_1$ according to the polarity of the input signal *ei*. Inasmuch as the magnitude E of the clock pulse signal generated by the oscillator COS is set at a value sufficiently larger than the reference voltage $E_s$, the output from the integrator IG always crosses twice time the zero volt line during one cycle, as shown by FIG. 4*e*, the output frequency of the time division signal which is the output from the comparator CO coincides with the frequency of the clock pulse signal provided by the oscillator COS.

Figure 5:
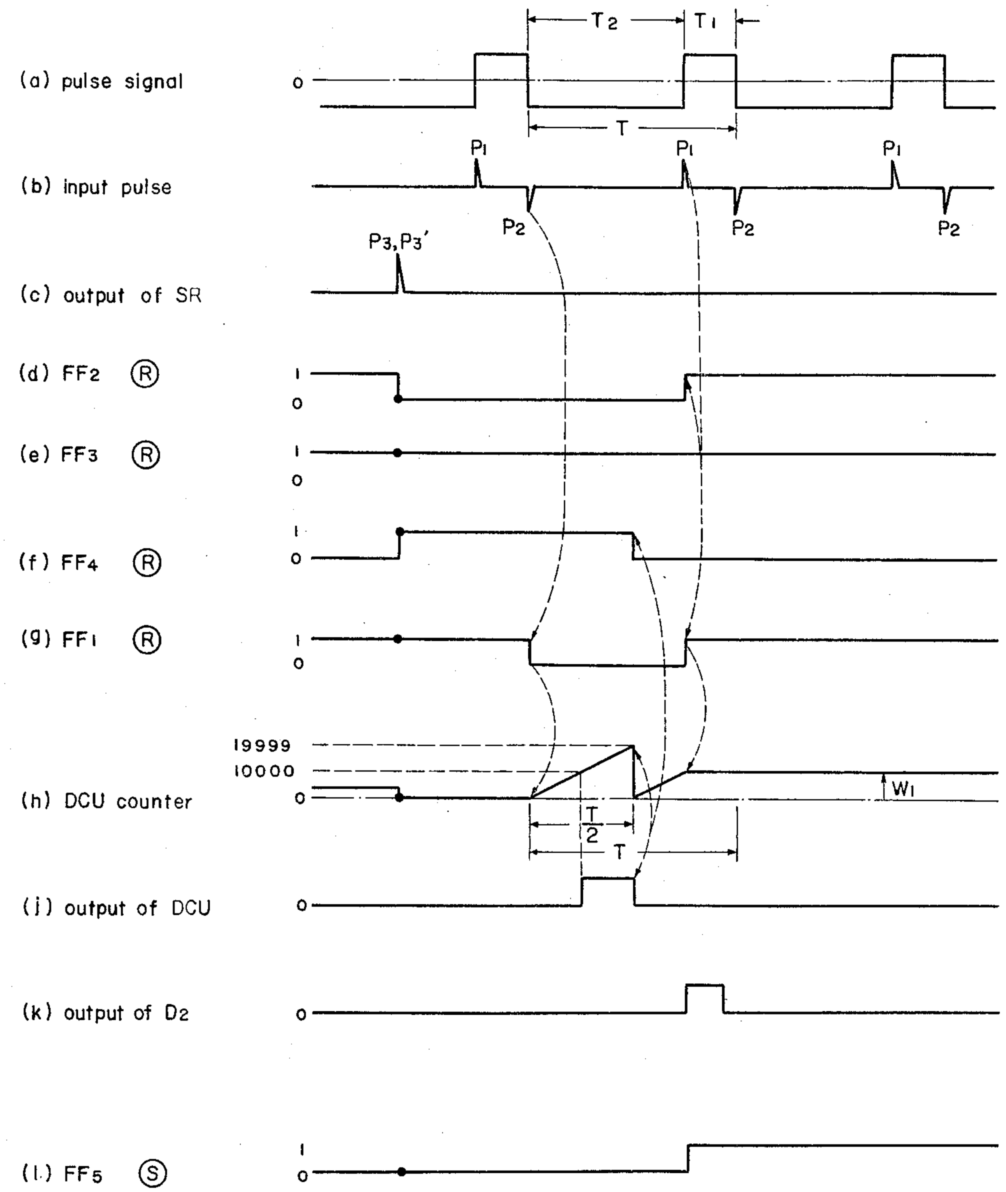
Figure 6:
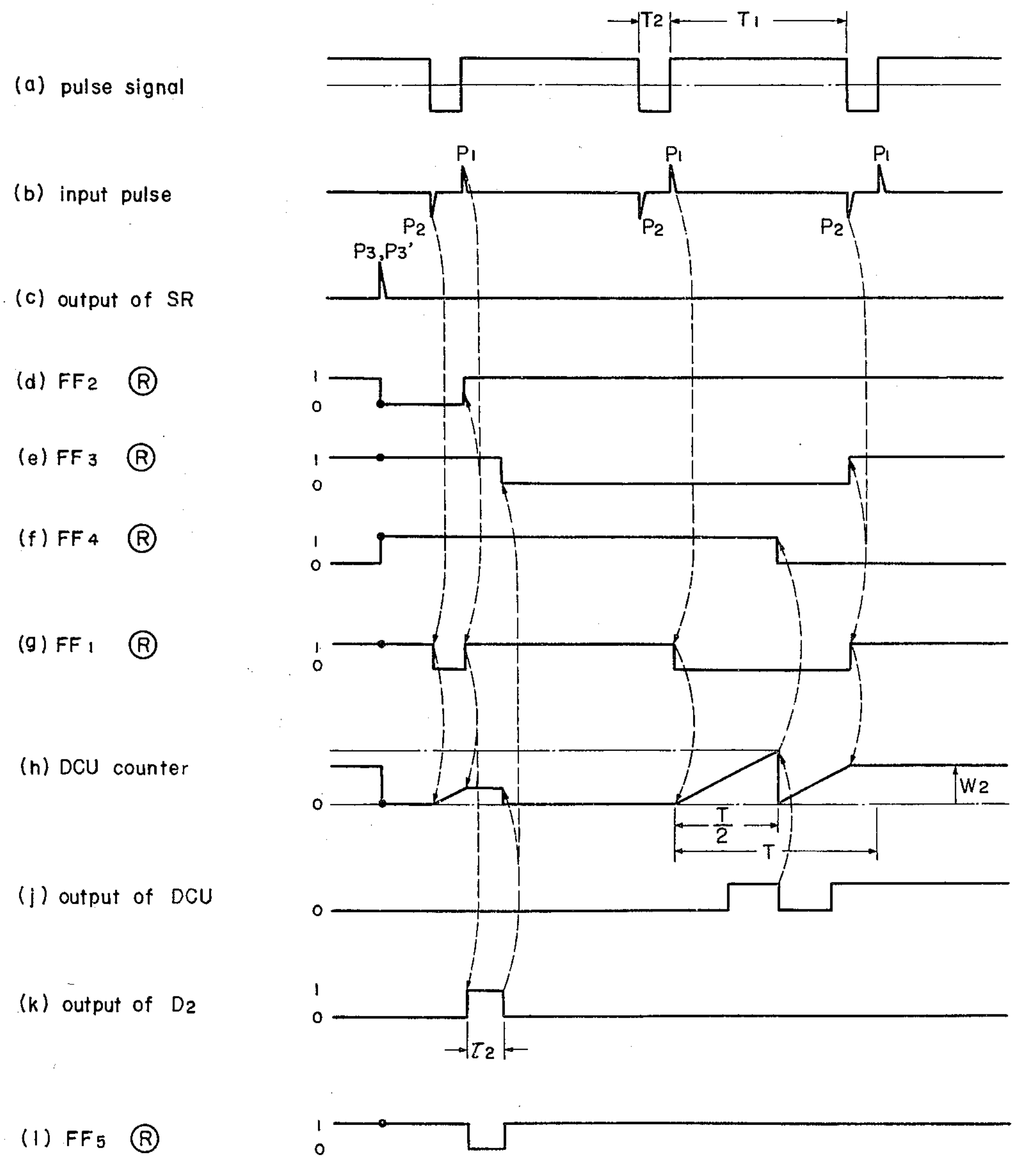

The operation of the pulse width measuring device for digitally measuring the pulse width, i.e. the period from the pulse $P_1$ to $P_2$ or $P_2$ to $P_1$, in orther words the circuit including the sample rate circuit II, unidirectional digit control circuit IV, unidirectional digit counter III and a positive-negative indicating circuit V, will now be considered by referring to FIGS. 5 and 6. At first the operation for measuring the pulse width of from $P_2$ to $P_1$ when the input signal *ei* is positive will be considered by referring to various waveforms shown in FIG. 5. FIGS. 5*a*, and 5*h* show output waveforms of said pulse width modulated signal, and FIGS. 5*d* to 5*g* show waveforms of the reset output R of flip-flops $FF_1$ through $FF_4$. FIGS. 5*h* and 5*j* show the state of counting of the DCU counter and the output wave form of unidirectional digit counter DCU, respectively. FIG. 5*k* shows the output from the delay circuit $D_2$, and FIG. 5*l* shows the set output from the positive-negative indicating circuit $FF_5$. When a drive pulse (shown in FIG. 5c) which is generated over a very long period (0.5 to 2 sec.) by the sample rate circuit II is impressed upon the drive input terminal 3, terminals (S, R) of the flip-flop circuit $FF_1$ for controlling the counter gate will be set to the state of (0, 1). Further the pulse $P_3$ sets terminals (S, R) of the flip-flop circuit $FF_4$ to the state of (0, 1) and restores the counted value of the counter DCU to zero. Concurrently therewith, or at a later time, if desired, the drive pulse $P_3'$ will be impressed upon the other drive input terminal 4 to set terminals (S, R) of the flip-flop to the state (1, 0) and the terminals (S, R) of the flip-flop $FF_3$ to the state (0, 1) respectively. In this case the state (1) of terminals (S, R) of the respective flip-flop circuits will generate a positive voltage, whereas the state (0) a zero voltage. Under these states, gates $G_2$ and $G_4$ are disenabled or closed upon receiving input pulses $P_1$ and $P_2$ because the reset output from the flip-flop $FF_3$ is in the state of (1). Whereas gates $G_1$ and $G_2$ are enabled or opened upon receiving input pulses $P_1$ and $P_2$ because reset output from the flip-flop $FF_2$ is in the (0) state. It is assumed now that the input pulse $P_1$ is applied. In this case, the pulse $P_1$ is applied to the reset input terminal of the flip-flop $FF_1$ through the gate $G_3$, and OR gates $OR_2$ and $OR_3$ but the pulse $P_1$ would not be inverted because the terminals (S, R) of the flip-flop $FF_1$ are in the state of (0, 1). As a result, the NAND gate circuit $G_5$ will be disenabled because it receives a negative pulse from the reset output of the flip-flop $FF_1$ through the inverter $INV_2$. Upon subsequently receiving the input pulse $P_2$, this pulse is applied to the set input terminal of the flip-flop $FF_1$ via gates $G_1$ and $OR_1$ to invert the state of terminals (S, R) of the flip-flop $FF_1$ from (0, 1) to (1, 0) (refer to FIG. 5g). Inversion of the flip-flop $FF_1$ causes the reset output to assume the state (0), thus enabling the positive NAND gate circuit $G_5$ whereby the clock pulse signal generated by the clock pulse generator *f* is applied to the unidirectional digit counter DCU to cause it to begin to unidirectionally count the number of pulses of the clock pulse signal as shown in FIG. 5h. When counting operation is performed for one half (which is equal to 19999 in the example illustrated of the maximum counting period T the counted value of the unidirectional digit counter DCU will be ones restored to zero, and the counting operation will be restarted from zero. The state of terminals (S, R) of the flip-flop $FF_4$ will be changed from (0, 1) to (1, 0) by the reset pulse which is generated when the count is restored to zero whereby to apply a voltage of zero volt to one input terminal of the positive NAND gate circuit $G_6$. Thereafter, when the input pulse $P_1$ is impressed upon the terminal 1, this pulse $P_1$ will be applied to the reset input terminal of the flip-flop $FF_1$ via gates $G_3$, $OR_2$ and $OR_3$ to again invert the state of terminals (S, R) of the flip-flop $FF_1$ from (1, 0) to (0, 1) to disenable the positive NAND gate circuit $G_5$ thus holding the counted value $W_1$ at that time of the counter DCU. The reset output at that time from the flip-flop $FF_1$ will be applied to the reset input terminals of flip-flop circuits $FF_2$ and $FF_3$ thus changing the state of terminals (S, R) of the flip-flop $FF_2$ from (1, 0) to (0, 1) while maintaining unchanged the state of terminals (S, R) of the flip-flop $FF_3$ at (0, 1). Consequently, gates $G_1$, $G_2$ and $G_3$ that are controlled by reset output from flip-flop circuits $FF_2$ and $FF_3$ will be rendered disenabled. Thus, upon subsequently receiving the input pulse $P_1$ or $P_2$ the state of the flip-flop $FF_1$ would not change. Since set output from the flip-flop $FF_2$ is applied to one terminal of the positive NAND gate circuit $G_6$ as a negative pulse through the delay circuit D and the inverter $IND_2$, the gate would not be enabled even when the output of the flip-flop $FF_4$ is zero. The reset output from the flip-flop $FF_2$ causes the terminal (S, R) of the flip-flop $FF_5$ included in the positive-negative indicating circuit to assume the state (1, 0), thus indicating by the set input that the input voltage is positive. Said counted value $W_1$ of the counter indicates the magnitude of its input signal *ei*.

Now the operation where the input signal *ei* is negative, or the operation of measuring the period of from pulse $P_1$ to $P_2$ will be considered by referring to various waveforms shown in FIG. 6. Waveforms shown in FIGS. 4a through 4l were taken from the same portions as those shown by FIGS. 5a through FIG. 5l. In the same manner as above described, drive signals $P_3$ and $P_3'$ from the sample rate circuit II function to respectively set terminals (S, R) of the flip-flop $FF_2$ to the state (1, 0), terminals (S, R) of the flip-flop $FF_3$ to (0, 1), terminals (S, R) of the flip-flop $FF_4$ to the state of (0, 1) and the unidirectional digit counter DCU to zero. At this time while gates $G_1$ and $G_3$ are enabled by the set output (0) from flip-flop $FF_2$, gates $G_2$ and $G_4$ are maintained disenabled by the reset output (1) of the flip-flop $FF_2$. Consequently, in this case too, operations identical to those described above will be repeated. More specifically, upon receiving the pulse $P_1$, this pulse will be impressed upon the reset input terminal of the flip-flop $FF_1$ through gates $G_3$, $OR_2$ and $OR_3$ but this pulse will not be inverted because terminals (S, R) of the flip-flop $FF_1$ is in (0, 1) state. When the pulse $P_2$ is received subsequently, this pulse will be impressed upon the set input terminal of the flip-flop $FF_1$ through gates $G_1$ and $OR_1$ to invert the state of terminals (S, R) of the flip-flop $FF_1$ to (1, 0). The reset output generated at this time by the flip-flop $FF_1$ enables the counter gate circuit $G_5$ whereby the counter DCU begins to undirectionally count the clock pulse. However, in this case, since the period $T_2$ from the pulse $P_2$ to the pulse $P_1$ is shorter than the period $T_1$ from the pulse $P_2$ to the pulse $P_1$ ($T_2<T_1$) the next pulse $P_1$ will be received before its counted value does not yet reach one of the maximum counting time. Upon receiving this pulse $P_1$, the state of terminals (S, R) of the flip-flop $FF_1$ would change to (0, 1) state thus disenabling the counter gate circuit $G_5$ (see waveform shown in FIG. 6h). Consequently, there is no output from the counter DCU and the state of terminals (S, R) of the flip-flop $FF_4$ does not change from (0, 1) state. The set output of the flip-flop $FF_1$, however, changes the state of terminals (S, R) of the flip-flop $FF_2$ to (0, 1) and the set output from this flip-flop $FF_2$ is applied to the reset input terminal of the flip-flop $FF_5$ and concurrently to the gate circuit $G_6$ via the delay circuit $D_2$ and the inverter $INV_2$. According, at this time, to the positive NAND gate circuit $G_6$ are applied a positive voltage of the reset output (1) from the flip-flop $FF_4$ and a negative pulse which is delayed by an interval $\tau_2$ by the output from the delay circuit $D_2$, thus generating a negative voltage on the output side of the NAND gate circuit $G_6$. This output pulse from the gate $G_6$ changes the state of terminals (S, R) of the flip-flop $FF_3$ from (0, 1) to (1, 0).

The set output (positive voltage) from the flip-flop $FF_3$ thus changed will be converted into a negative pulse through the (NOR) gate to reset the counter DCU. At this time since flip-flop $FF_1$ is in the state of (0, 1) while the flip-flop $FF_4$ is in the state of (0, 1) their state would not be changed. Thus, when the terminals (S, R) of the flip-flop $FF_2$ assume the state (0, 1) and the terminals (S, R) of the flip-flop $FF_3$ assume the state (1, 0), gates $G_2$ and $G_3$ will become disenabled and gates $G_2$ and $G_4$ enabled which are opposite to the conditions of the previous case. Consequently, upon receiving the pulse $P_2$, the flip-flop $FF_1$ will not change its state because it has been in the state of (0, 1) but upon receiving the pulse $P_1$ it will change to (1, 0) state, thus opening the counter gate circuit $G_5$ to initiate the counting operation. As already described, when counting operation has proceeded to one half of the maximum counting time of the counter, the counted number will be returned to zero and counting operation will be restarted from zero. The counted value $W_2$ is holded upon receiving the pulse $P_2$. These operations are identical to those performed when a positive input voltage is received. At this time, the state of terminals (S, R) of the flip-flop $FF_5$ included in the positive-negative indicating circuit V is changed because the gate circuit $G_6$ is disenabled as shown in FIG. 6*l* whereby an indication of negative is made by the reset output from the flip-flop $FF_5$.

Counted values $W_1$ and $W_2$ and indications of positive and negative provided by the novel apparatus causes to repeat said measuring and indicating operations at an interval of about 100 ms. at each period (0.5 to 2 sec.) of drive signals $P_3$ and $P_3'$ applied by the sample rate circuit II and these values can be displayed by stationary digits representing the values counted by the counter when counted values are held.

Thus, the novel digital voltmeter is provided with a circuit wherein a pulse width modulated signal having a pulse with corresponding to an input analogue signal is obtained by superposing a clock pulse signal of a relatively large rectangular waveform upon the input analogue signal and a pulse width modulated pulse signal, integrating the sum of these signals by means of an integrator, comparing the integrated output with a zero voltage by means of a comparator, and by subjecting pulse signals to pulse width modulation by utilizing pulses generated at cross-points between said integrated output and said zero volt. Thus it is possible to apply to the input terminal a clock pulse signal of rectangular waveform having larger amplitude than the reference voltage of said pulse signal so that the slope of the integrated output becomes very steep, thus enabling stable measurement even at very small voltages near zero. Further as the novel digital voltmeter is provided with means to digitally measure the pulse width of the pulse width modulated signal or said unidirectional count control circuit so that it becomes possible to measure by time division scheme the pulse width corresponding to positive and negative input voltages by means of a unidirectional digit counter circuit which can count in one direction alone, thus greatly simplifying the counter circuit and the like.

Thus it will be clear that this invention provides a novel digital voltmeter which has simple construction and yet has an excellent response characteristic.

The foregoing discussion is intended to illustrate the principles of the invention. Numerous applications of these principles to various arrangements may occur to workers in the art without departure from the spirit and scope of the invention as defined in the appended claims.

What is claimed is:

1. A digital voltmeter comprising a pulse width modulator including an addition integrator to add a pair of positive and negative reference voltages which are alternately supplied and an input voltage and to integrate the sum of the voltages, a reference signal oscillator to generate a signal of a constant recurring frequency, and a voltage comparator to compare the output amplitude from said integrator with the output amplitude from said reference signal oscillator to generate an output which switches said pair of reference voltages so that mean value of the sum of the voltages impressed upon the input terminal of said integrator becomes zero whereby said pulse width modulator generates a pulse width modulated signal proportional to the value of said input signal; and a digital measuring circuit for the pulse width which repeatedly and digitally measures the pulse width of the output pulse from said pulse width modulator.

2. A digital voltmeter comprising a pulse width modulating circuit including an addition integrator to integrate the sum of a pair of positive and negative reference voltages which are switched alternately, a clock pulse signal of a rectangular waveform having a relatively larger amplitude than said reference voltages, and an input analogue signal; a voltage comparator to compare the output amplitude from said integrator with a zero voltage to generate an output which operates to switch said pair of reference voltages so that the sum of the voltages applied to the input terminal of said integrator becomes zero whereby to generate a pulse width modulated signal proportional to the magnitude of said input signal; and a pulse width measuring circuit for digitally and repeatedly measuring the pulse width of the output pulse from said pulse width modulating circuit.

3. The digital voltmeter according to claim 1 which comprises a unidirectional count control circuit including a plurality of gates to which are impressed a first pulse and a second pulse which are generated each time when the polarity of said pulse width modulated signal is inverted from negative to positive or vice versa, two flip-flop circuits to control a particular gate to become enabled upon receiving said first or second pulse and a flip-flop circuit for controlling a counter gate controlled by the output from said plurality of gates, and a unidirectional digit counter circuit controlled by said unidirectional count control circuit to set the maximum counting period of said counter to be equal to the period of said pulse width modulated signal whereby the counted value is restored to zero when one half of the period of said pulse width modulated signal has been elapsed from an instant at which counting operation has commenced and the counting operation is restarted from zero; said digital voltmeter operates such that when the period between an instant at which said second impulse is impressed upon said plurality of gates and an instant at which next first pulse is applied is longer than one half of the period of said pulse width modulated signal, the counted value of said unidirectional digit counter circuit is restored to zero, counting operation is restarted from zero to change the state of said two flip-flop circuits by said flip-flop circuit for controlling said counter gate upon receiving said first pulse, whereby to enable all of said plurality of gates to measure the voltage of positive polarity by the counted value of said unidirectional digit counter circuit at that time and that when said period is shorter than one half of the period of said pulse width modulated signal the state of two flip-flop circuits is changed by the output from said unidirectional digit counter whereby to enable another particular gate to count, by the time division scheme, the period from an instant at which said first pulse is applied to an instant at which said second impulse is applied thus measuring the voltage of negative polarity.

4. The digital voltmeter according to claim 2 which comprises a unidirectional count control circuit including a plurality of gates to which are impressed a first pulse and a second pulse which are generated each time when the polarity of said pulse width modulated signal is inverted from negative to positive or vice versa, two flip-flop circuits to control a particular gate to become enabled upon receiving said first or second pulse and a flip-flop circuit for controlling a counter gate controlled by the output from said plurality of gates, and a unidirectional digit counter circuit controlled by said unidirectional count control circuit to set the maximum counting period of said counter to be equal to the period of said pulse width modulated signal whereby the counted value is restored to zero when one half of the period of said pulse width modulated signal has been elapsed from an instant at which counting operation has commenced and the counting operation is restarted from zero; said digital voltmeter operates such that when the period between an instant at which said second impulse is impressed upon said plurality of gates and an instant at which next first pulse is applied is longer than one half of the period of said pulse width modulated signal, the counted value of said unidirectional digit counter circuit is restored to zero, counting operation is restarted from zero to change the state of said two flip-flop circuits by said flip-flop circuit for controlling said counter gate upon receiving said first pulse, whereby to enable all of said plurality of gates to measure the voltage of positive polarity by the counted value of said unidirectional digit counter circuit at that time and that when said period is shorter than one half of the period of said pulse width modulated signal the state of two flip-flop circuits is changed by the output from said unidirectional digit counter whereby to enable another particular gate to count, by the time division scheme, the period from an instant at which said first pulse is applied to an instant at which said second impulse is applied thus measuring the voltage of negative polarity.

5. A time-division pulse width modulator comprising
an addition integrator to add a pair of positive and negative reference voltages which are alternately supplied and an input voltage and to integrate the sum of the voltages;
a reference signal oscillator to generate a signal of a constant recurring frequency; and
a voltage comparator adapted to compare the output amplitude from said integrator with the output from said reference signal oscillator to generate an output which switches said pair of reference voltages so that the mean value of the sum of the voltages impressed upon the input terminal of said integrator becomes zero.

6. An analog-digital (A/D) converter comprising
an addition integrator to add a pair of reference voltages of positive and negative polarity, respectively, which are alternately supplied, and an analog input voltage, said integrator integrating the sum of the voltages;
a reference signal oscillator to generate a signal of a constant recurring frequency;
a voltage comparator connected to compare the output amplitude from said integrator with the output amplitude from said reference signal oscillator to generate an output signal which switches said pair of reference voltages so that the mean value of the sum of the voltages impressed upon the input terminal of said integrator becomes zero; and
timing means responsive to the width of said output signal deriving a digital value as a function of said width.

References Cited

UNITED STATES PATENTS

| | | | |
|---|---|---|---|
| 3,051,939 | 8/1962 | Gilbert | 340—347 |
| 3,087,147 | 4/1963 | Norris et al. | 324—111 XR |
| 3,267,458 | 8/1966 | Anderson | 340—347 |
| 3,296,323 | 1/1967 | Anderson | 340—347 |

RUDOLPH V. ROLINEC, Primary Examiner
ERNEST F. KARLSEN, Assistant Examiner

U.S. Cl. X.R.

324—111; 332—9, 14; 340—347